(12) United States Patent
Marx

(10) Patent No.: US 6,818,706 B2
(45) Date of Patent: Nov. 16, 2004

(54) POLYMER MIXTURE

(75) Inventor: Uwe Marx, Postbauer-Heng (DE)

(73) Assignee: Nexans, Paris (FR)

( * ) Notice: Subject to any disclaimer, the term of this patent is extended or adjusted under 35 U.S.C. 154(b) by 153 days.

(21) Appl. No.: 10/067,406

(22) Filed: Feb. 7, 2002

(65) Prior Publication Data

US 2002/0156192 A1 Oct. 24, 2002

(30) Foreign Application Priority Data

Feb. 21, 2001 (DE) .......................... 101 08 347

(51) Int. Cl.$^7$ ........................ C08F 228/00; C08G 75/00
(52) U.S. Cl. ................ 525/328.5; 525/181; 525/330.7; 525/535; 525/537
(58) Field of Search .............................. 525/328.5, 181, 525/330.7, 535, 537

(56) References Cited

U.S. PATENT DOCUMENTS

| | | | |
|---|---|---|---|
| 5,721,282 A | * | 2/1998 | Schonfeld et al. |
| 6,025,440 A | | 2/2000 | Scheckenbach et al. |
| 6,121,353 A | | 9/2000 | Umino et al. |

FOREIGN PATENT DOCUMENTS

| | | |
|---|---|---|
| DE | 4439767 | 2/1998 |
| DE | 19603353 | 3/2003 |
| EP | 0053778 | 3/1985 |
| EP | 0 199 991 | 11/1986 |
| EP | 0 367 629 | 5/1990 |
| EP | 0 633 291 | 1/1995 |
| EP | 0850993 | 2/2000 |
| JP | 62043459 | 2/1987 |
| JP | 61266451 | 10/1987 |
| JP | 2155943 | 6/1990 |
| JP | 11199738 | 7/1999 |
| JP | 2000284611 | 10/2000 |

\* cited by examiner

*Primary Examiner*—Duc Truong
(74) *Attorney, Agent, or Firm*—Sughrue Mion, PLLC

(57) ABSTRACT

A polymer mixture of a thermoplastically processable fluoropolymer and a sulfur polymer, wherein the sulfur polymer component in the polymer mixture is 0.1 to 20% by weight.

5 Claims, No Drawings

POLYMER MIXTURE

This application is based on and claims the benefit of German Patent Application No. 10108347.5 filed Feb. 21, 2001, which is incorporated by reference herein.

BACKGROUND OF THE INVENTION

The invention relates to a polymer mixture based on fluoropolymers. Fluoropolymers, such as polytetrafluoroethylene, ethylene-tetrafluoroethylene copolymer, tetrafluoroethylene-perfluoropropylene copolymer, perfluoroalkoxy copolymer, polyvinylidene fluoride, polyvinyl fluoride, polychlorotrifluoroethylene, ethylene-chlorotrifluoroethylene copolymer, or mixtures of these polymers, are non-combustible, highly weatherproof and physiologically inert within the application range. They have application temperature ranges with broad lower and upper limits that other plastics cannot reach, are highly corrosion and solvent resistant and have excellent electrical values which depend on their chemical structure.

Polytetrafluoroethylene has valuable application properties in optimum combination. The disadvantage is that polytetrafluoroethylene cannot be thermoplastically processed above its melting temperature of 327° C. due to its extremely high viscosity. Extruded shapes of polytetrafluoroethylene, particularly insulation or sheathing on cables and lines can be produced only by ram extrusion or paste extrusion.

Tetrafluoroethylene-perfluoropropylene copolymer (FEP) and perfluoroalkoxy copolymer (PFA) are modified for thermoplastic processing but require very high processing temperatures.

Ethylene-tetrafluoroethylene copolymer (ETFE) is much easier to process but this processability in more accessible temperature ranges is bought at the price of a maximum service temperature lower by about 100 K.

All of the fluoropolymers cited have in common that items manufactured from these materials are very expensive. On the one hand, the fluoropolymers are very costly compared to most other thermoplastics, on the other hand, the costs to process them are also higher.

For this reason, the application range for these materials is limited to specialty products.

SUMMARY OF THE INVENTION

The object of the present invention is to provide a polymer mixture based on fluoropolymers which can be thermoplastically processed and is significantly more economical to produce than the pure fluoropolymers that have thus far been used.

This object is attained by a polymer mixture of a thermoplastically processable fluoropolymer and a sulfur polymer, wherein the sulfur polymer component in the polymer mixture is 0.1 to 20% by weight.

Other advantageous embodiments of the invention will be apparent from the following detailed description of the invention in conjunction with the appended claims.

In addition to the advantages resulting from the problem formulation itself, it has also proven advantageous that a higher tensile strength and a higher elongation at break compared to pure fluoropolymers can result.

Adding sulfur polymers makes it possible to lower the processing temperature of fluoropolymers.

DETAILED DESCRIPTION OF THE INVENTION

The invention will now be described in greater detail by means of an exemplary embodiment.

90 parts tetrafluroethylene/hexafluoropropylene copolymer (FEP) and 10 parts polysulfone (PSU) mixed in granulate form are introduced into an extruder and at a temperature of 350° C. are applied to an electric conductor.

As a comparison, pure tetrafluoroethylene/hexafluoropropylene copolymer (FEP) in granulate form was introduced into an extruder and at a temperature of 360° C. was applied to an electrical conductor. In both cases the conductor cross section was 0.5 mm$^2$, the wall thickness of the insulation layer was 0.2 mm.

The sheathed electrical conductors were subjected to a quality test.

The following values were obtained:

|  | Parts | |
| --- | --- | --- |
| FEP | 100 | 90 |
| PSU |  | 10 |
| Mechanical Properties | | |
| $\sigma_b$ [Mpa] | 27 | 40 |
| $\epsilon_R$ [%] | 205 | 215 |
| Mechanical Properties after Aging | | |
| $\sigma_b$ [Mpa] | 27 | 45 |
| $\epsilon_R$ [%] | 210 | 205 |
| Thermal shock (250° C./6 h), 1 kV/1 min | | |
| Passed | yes | yes |
| Electrical Properties | | |
| tan δ | $1 \times 10^{-3}$ | $1 \times 10^{-3}$ |
| Volume resistance | $7.9 - 10^{16}$ | $4.0 \times 10^{16}$ |
| Dielectric constant | 1.91 | 1.93 |
| Extrusion Temperatures | | |
| Temperature [° C.] | 330–390 | 330–380 |

What is claimed is:

1. A polymer mixture for an insulating layer on an electric line or for a sheath for electrical cables or lines, consisting of:

(a) at least one resin selected from the group consisting of tetrafluoroethylene-perfluoropropylene copolymer (FEP) and ethylene-tetrafluoroethylene copolymer (ETFE); and (b) at least one resin selected from the group consisting of polyphenylene sulfide (PPS), polysulfone (PSU), and polyether sulfone (PES);

wherein (a) is present in the polymer mixture in the amount of from 80 to 99.9% by weight and (b) is present in the polymer mixture in the amount of from 0.1 to 20% by weight.

2. The polymer mixture of claim 1, wherein (b) is present in the polymer mixture in the amount of from 10 to 20% by weight.

3. The polymer mixture of claim 1, wherein (b) is present in the polymer mixture in the amount of from 15 to 20% by weight.

4. An insulating layer on an electric line, comprising a polymer mixture as claimed in claim 1.

5. A sheathing mixture for electrical cables or lines, comprising a polymer mixture as claimed in claim 1.

* * * * *